Jan. 1, 1963

R. A. HUNT ETAL 3,071,370

SHEET FEEDING APPARATUS

Filed Aug. 1, 1960

INVENTORS
ROBERT A. HUNT
GORDON P. TAILLIE

BY

ATTORNEY

INVENTORS
ROBERT A. HUNT
GORDON P. TAILLIE
BY
ATTORNEY

Jan. 1, 1963  R. A. HUNT ETAL  3,071,370
SHEET FEEDING APPARATUS
Filed Aug. 1, 1960  11 Sheets-Sheet 3

INVENTORS
ROBERT A. HUNT
GORDON P. TAILLIE
BY
ATTORNEY

INVENTORS
ROBERT A. HUNT
GORDON P. TAILLIE
BY
*Numan P. Schuster*
ATTORNEY

Jan. 1, 1963 R. A. HUNT ETAL 3,071,370
SHEET FEEDING APPARATUS

Filed Aug. 1, 1960 11 Sheets-Sheet 5

INVENTORS
ROBERT A. HUNT
GORDON P. TAILLIE
BY

ATTORNEY

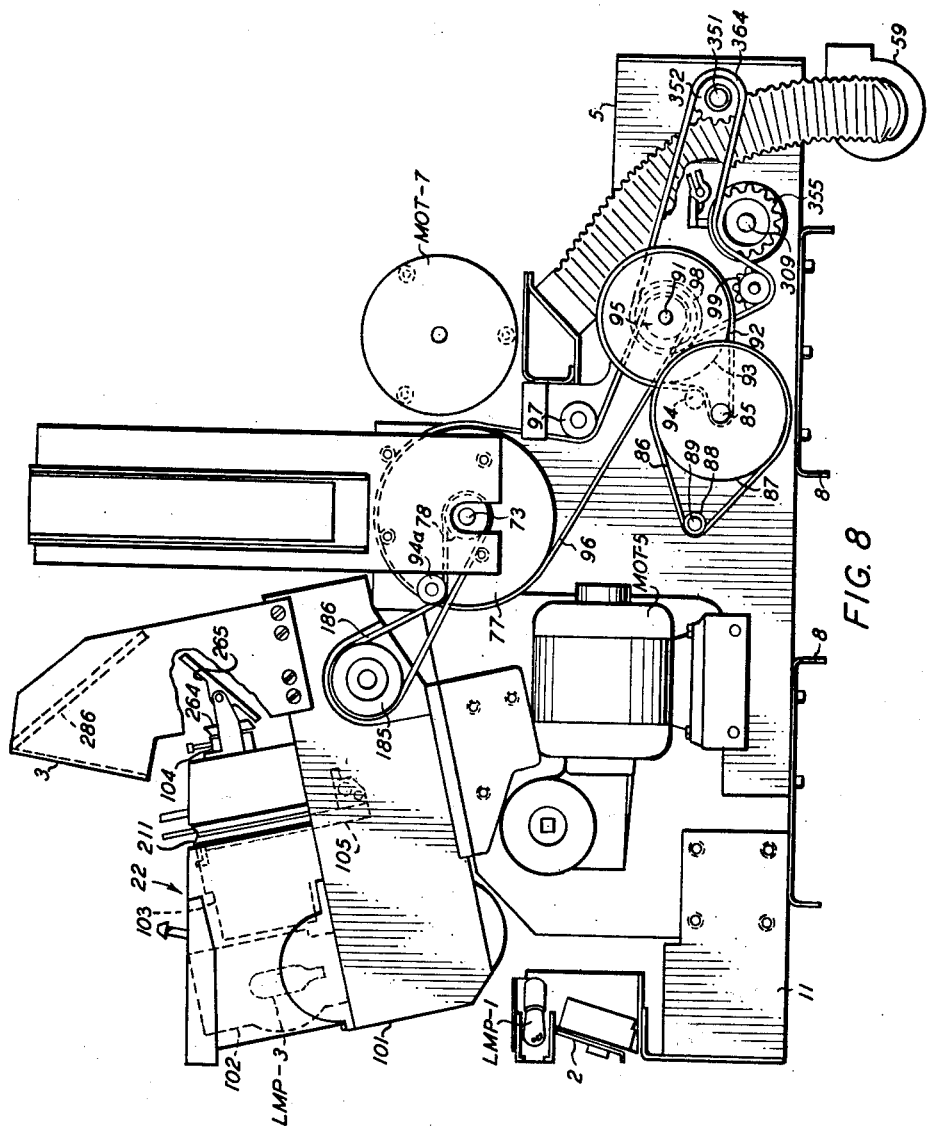

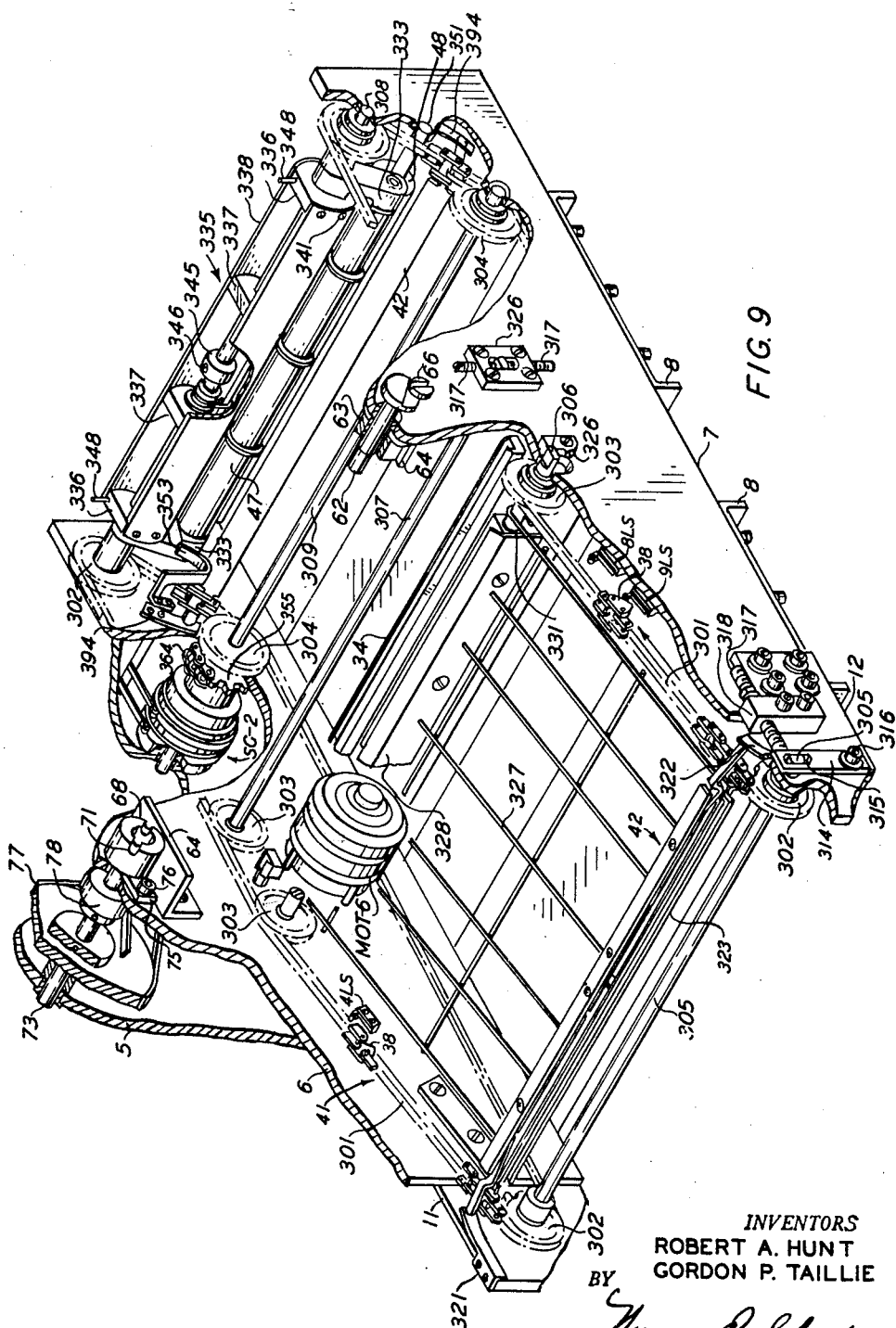

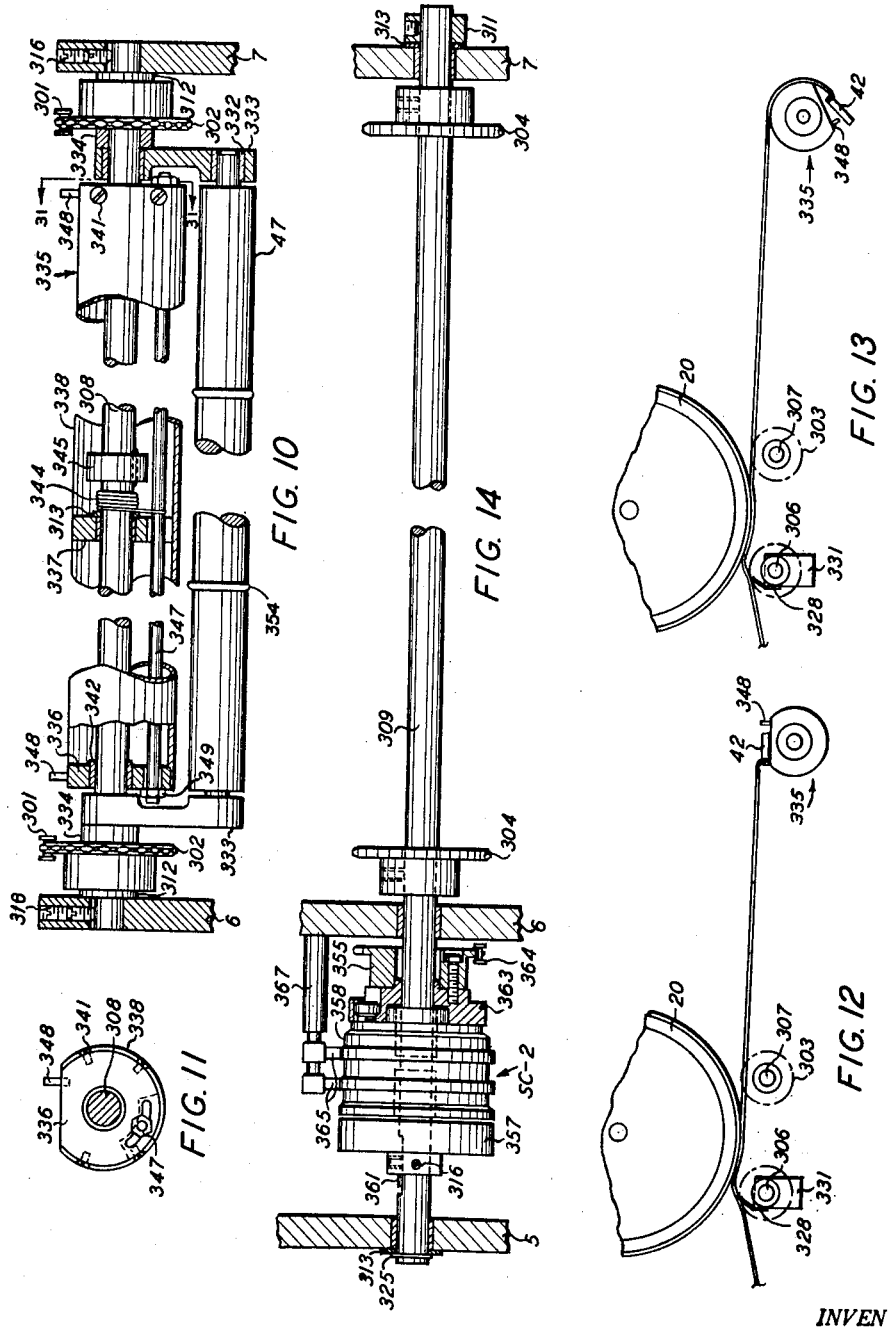

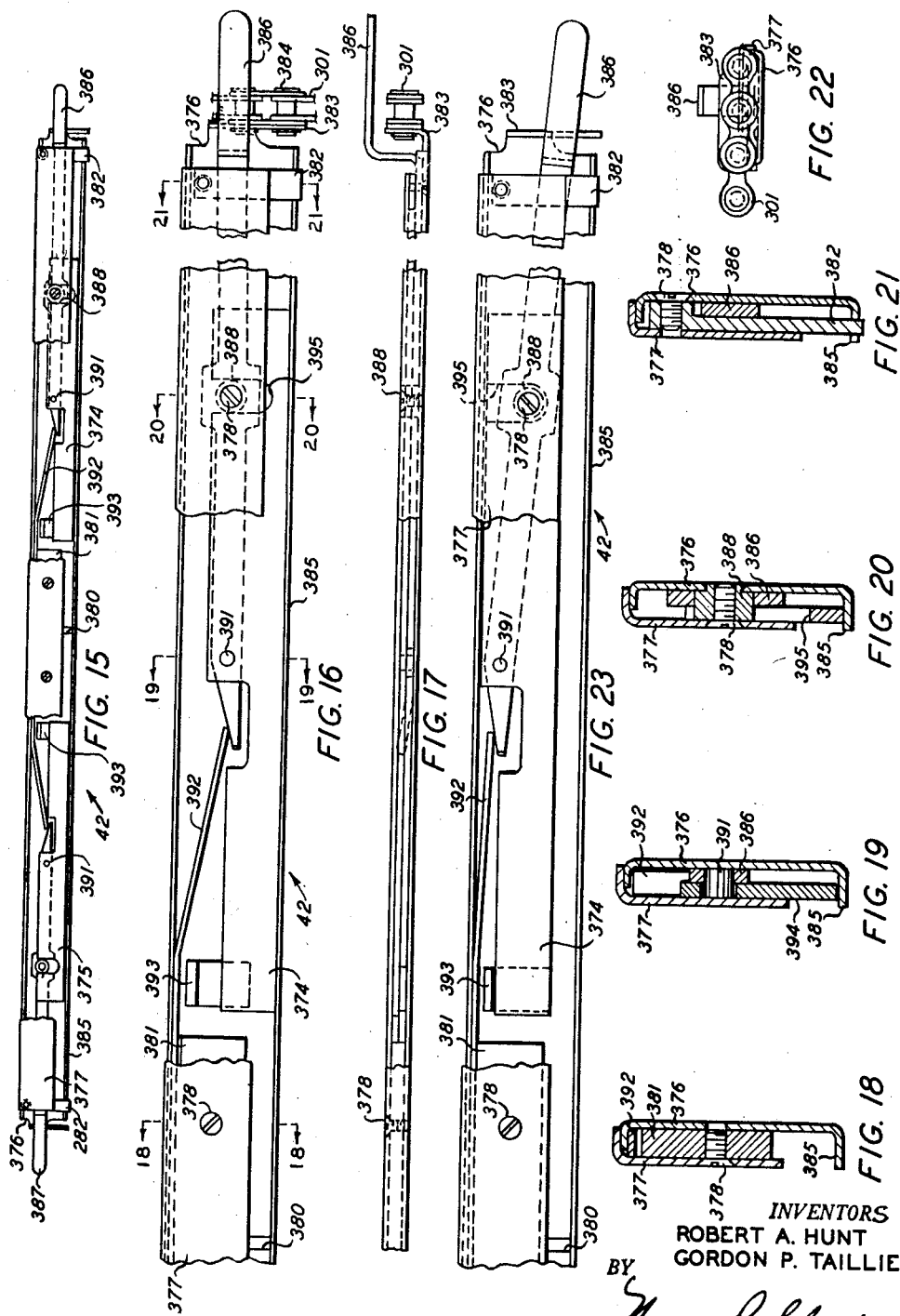

INVENTORS
ROBERT A. HUNT
GORDON P. TAILLIE

ATTORNEY

INVENTORS
ROBERT A. HUNT
GORDON P. TAILLIE ical control to the powder, or to carry the powder to an image surface and, simultaneously, to provide almost complete homogeneity of charge polarity. In the development of the image, the toner powder is brought into surface contact with the coating and is held thereon electrostatically in a pattern corresponding to the electrostatic latent image. Thereafter, the developed xerographic image is transferred to a support or transfer material to which it may be fixed by any suitable means.

United States Patent Office 3,071,370
Patented Jan. 1, 1963

3,071,370
SHEET FEEDING APPARATUS
Robert A. Hunt, Huntington Station, and Gordon P. Taillie, Rochester, N.Y., said Hunt assignor to Xerox Corporation, a corporation of New York
Filed Aug. 1, 1960, Ser. No. 46,462
7 Claims. (Cl. 271—7)

This invention relates in general to xerographic apparatus and, in particular, to a sheet feeding mechanism or sheet conveyor for seriatim feeding of sheets of transfer material to a xerographic drum.

More specifically, the invention relates to an improved sheet feeding mechanism or sheet conveyor that is particularly adapted for use in xerographic reproducing machines, and which is also suitable for use with comparable types of devices.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electrostatic powder, hereinafter referred to as toner, and a granular carrier material, which latter functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into surface contact with the coating and is held thereon electrostatically in a pattern corresponding to the electrostatic latent image. Thereafter, the developed xerographic image is transferred to a support or transfer material to which it may be fixed by any suitable means.

The invention relates to conveyors and in particular to sheet gripper mechanisms for conveying a sheet of support or transfer material, such as paper or the like, to contact the xerographic plate in synchronized movement therewith whereby the developed xerographic image from the xerographic plate is transferred in proper registration on the sheet of support material. The sheet of transfer material must be brought into contact with the xerographic plate without parts of the conveyor mechanism coming into contact with the photoconductive insulating surface of the xerographic plate.

It is therefore the principal object of this invention to improve a sheet feeding mechanism for use in automatic xerographic apparatus in which a reusable xerographic plate may sccessively be charged, exposed and developed, and in which the developed image may readily be transferred to a sheet of transfer material, such as paper or similar material, and thereby permit continuous reuse of the xerographic plate.

Another object of this invention is to improve sheet feeding mechanisms for feeding sheets seriatim to a rotating drum independently of the drum's rotative cycle.

A further object of this invention is to improve sheet gripper mechanisms for use in a sheet conveyor whereby various sized sheets of transfer material may be conveyed by the sheet conveyor.

These and other objects of the invention are attained by means of a sheet conveyor including two endless belts, pulley means supporting the two endless belts for travel in unison in two spaced parallel planes, a gripper bar housing having a paper engaging lip, means connecting the gripper bar housing to the endless belts along a line perpendicular to the two spaced parallel planes of travel of the endless belts, a first gripper bar and a second gripper bar movably supported in the gripper bar housing, spring means mounted in the gripper bar housing to normally bias the first gripper bar and second gripper bar into contact with the paper engaging lip of the gripper bar housing, a first lever pivotally secured at one end to the first gripper bar and intermediate its ends to the gripper bar housing, with its opposite end extending beyond the gripper bar housing, a second lever pivotally secured at one end to the second gripper bar and intermediate its ends to the gripper bar housing with its opposite end extending beyond the gripper bar housing and cam means positioned adjacent the endless belts to be in interference position with the first and second lever as the gripper bar housing is moved by the endless belts whereby the first lever and second lever will be actuated to force the first gripper bar and second gripper bar, respectively, out of engagement with the paper engaging lip of the gripper bar housing.

For a better understanding of the invention as well as other objects and further features thereof, reference is had to the following detailed description of the invention to be read in connection with the accompanying drawings, wherein:

FIG. 8 is a sectional view of the xerographic drive elements taken along line 8—8 of FIG. 4;

FIG. 9 is a right-hand perspective view of the paper conveyor mechanism of the apparatus with parts broken away to show the arrangement of the various elements;

FIG. 10 is a sectional view of the paper guide roll and delivery roller taken along line 10—10 of FIG. 3;

FIG. 11 is a sectional view of the paper guide roll taken along line 11—11 of FIG. 10;

FIGS. 12 and 13 illustrate schematically the operation of the paper guide roll;

FIG. 14 is a sectional view of the conveyor drive assembly taken along line 14—14 of FIG. 3;

FIG. 15 is a top view of a paper gripper;

FIG. 16 is an enlarged top view of a portion of the paper gripper of FIG. 15;

FIG. 17 is an enlarged rear view of the paper gripper of FIG. 16;

FIG. 18 is an enlarged sectional view of the paper gripper taken along line 18—18 of FIG. 16;

FIG. 19 is an enlarged sectional view taken along line 19—19 of FIG. 16;

FIG. 20 is an enlarged sectional view taken along line 20—20 of FIG. 16;

FIG. 21 is an enlarged sectional view taken along line 21—21 of FIG. 16;

FIG. 22 is an enlarged end view of the paper gripper;

FIG. 23 is a view similar to FIG. 15 showing the gripper in an open position;

Figure 1:
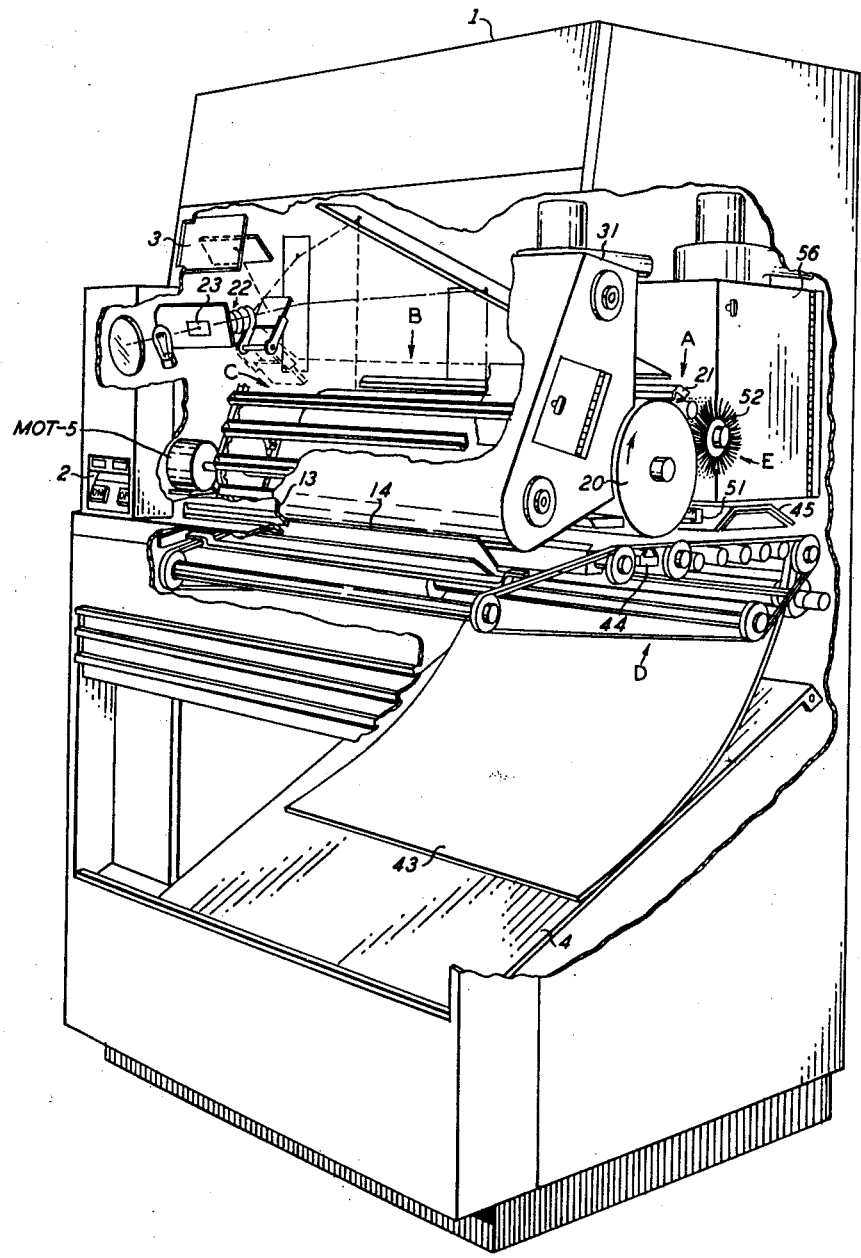
FIG. 1 is a right-hand perspective view of the xerographic apparatus of the invention enclosed within a cabinet, with parts of the cabinet covering broken away to show the arrangement of the xerographic machine elements schematically.

Referring now to the drawings, there is shown in FIG. 1 a xerographic reproducing machine used for producing xerographic reproductions from microfilm, whether in the form of a continuous web or in the form of an individual frame mounted on a suitable apertured card. To conform to modern office decor the xerographic apparatus is adapted for installation in a suitable console or cabinet.

The cabinet, generally designated 1, constructed in a conventional manner, has mounted on the left-hand side thereof a main cotnrol panel 2 for initiating operation of the machine. Positioned directly above the control panel is a viewing platen or screen 3 described in full detail hereinafter. In the embodiment disclosed, the cabinet of conventional construction, serves as a light-tight housing for the xerographic apparatus. As shown, the xerographic apparatus is positioned in the upper portion of the cabinet, the lower portion of the cabinet having a recessed inclined collecting tray 4 for finished reproductions.

Figure 2:
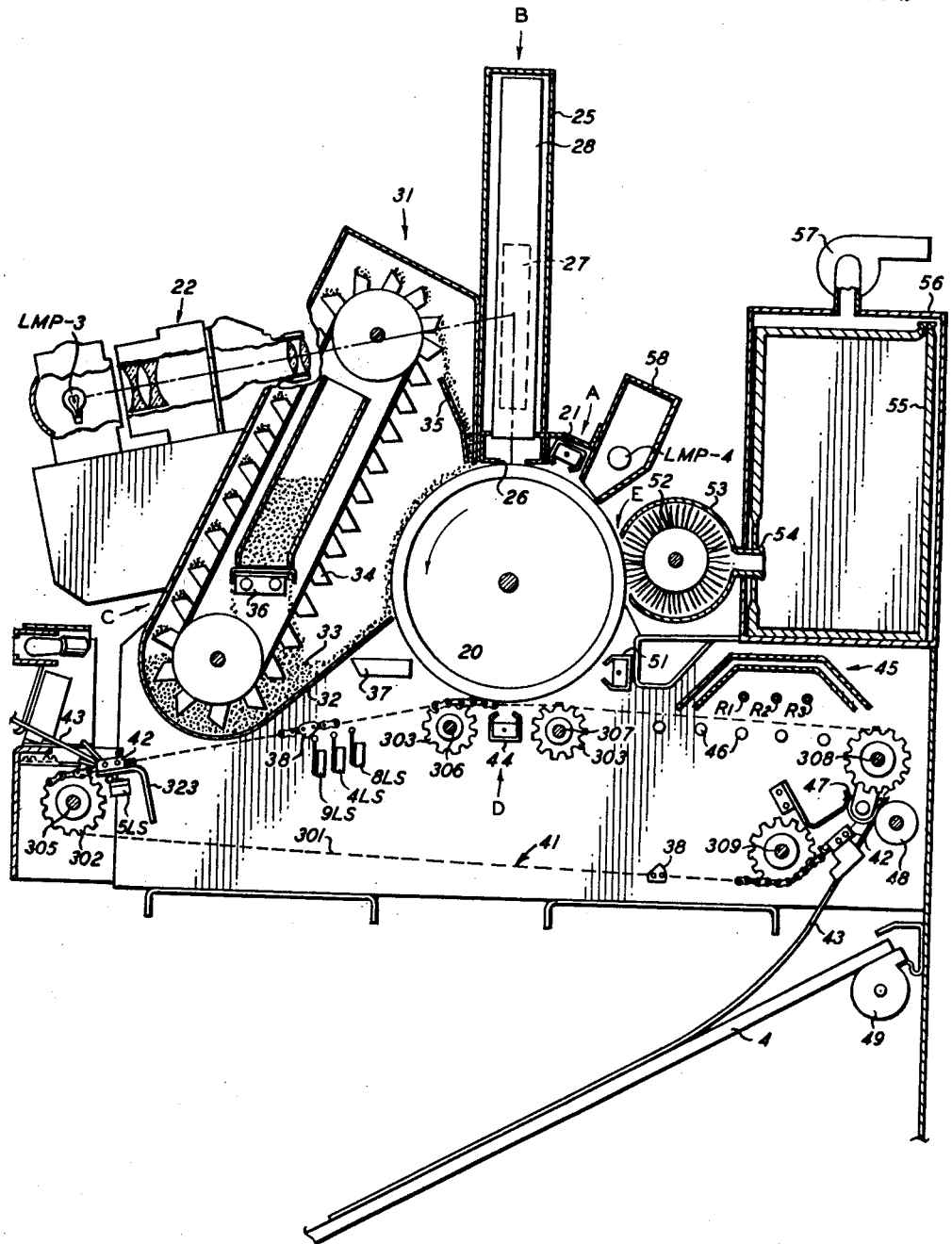
FIG. 2 illustrates schematically a preferred embodiment of the xerographic apparatus of the invention.

As shown in FIGS. 1 and 2, the xerographic apparatus of the type disclosed in copending application Serial No. 46,463 filed concurrently herewith on August 1, 1960, in the name of Hunt et al., comprises a xerographic plate including a photoconductive layer or light-receiving surface on a conductive backing and formed in the shape of a drum, generally designated by numeral 20, which is journaled in the frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum; an exposure station at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced.

A transfer station, at which the xerographic powder image is electrostatically transferred from the drum surface to a transfer material or support surface; and A drum cleaning and discharge station, at which the drum surface is first charged and then brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus or corona charging device 21 includes a corona discharge array of one or more discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project an image onto the surface of the photoconductive xerographic drum from a suitable original. To permit the utilization of copy in the form of microfilm either in a continuous web or as individual frames mounted in suitable apertured cards, the optical projection system shown includes a projector of the type disclosed in copending application, Serial No. 46,435, filed concurrently herewith on August 1, 1960, in the name of Rutkus et al.

The optical scanning or projection mechanism includes a projector 22 having a movable carriage for transporting a film holder in light-projecting relation to the moving light-sensitive surface of the xerographic drum. Uniform lighting of an object, such as film 23, is provided by means of a projection lamp LMP–3, connected to a suitable electrical circuit.

A light shield 25 adapted to protect the xerographic drum from extraneous light at the exposure station is positioned adjacent to the surface of the xerographic drum. A slot aperture 26 in the light shield extends transversely to the path of movement of the light-receiving surface of the xerographic drum to permit reflected rays from the film to be directed against a limited transverse area of the light-receiving surface as it passed therebeneath. To enable the projector 22 to be mounted on the front of the machine for operator convenience, a folded optical system including an object mirror 27, and an image mirror 28, is used in the preferred embodiment of the invention, the object mirror and image mirror being mounted in the light shield. The film holder supported by the movable carriage of the projector, is arranged for movement in a path to transverse the optical path of the lens whereby the subject image of the film is scanned in timed relation to the movement of the light-receiving surface of the xerographic drum to project a light image corresponding to the subject image onto the surface of the xerographic drum.

Adjacent to the exposure station is a developing station C in which there is positioned a developer apparatus 31 including a developer housing 32 having a lower or sump portion for accumulating developer material 33. Mounted within the developer housing is a bucket-type conveyor 34 driven by a motor MOT–5, the conveyor being used to carry the developer material previously supplied to the developer housing to the upper portion of the developer housing from where the developer material is cascaded over a hopper chute 35 onto the drum.

As the developer material cascades over the drum, toner particles of the developer material adhere electrostatically to the previously formed electrostatic latent image areas on the drum to form a visible xerographic powder image, the remaining developer material falling off the peripheral surface of the drum into the bottom of the developer housing. Toner particles consumed during the developing operation to form the xerographic powder images are replenished by a toner dispenser 36, of the type disclosed in copending Hunt application, Serial No. 776,976, filed November 28, 1958, mounted within the developer housing and driven by motor MOT–5 through a suitable drive mechanism (not shown).

It is believed that the foregoing description of the developer apparatus and toner dispenser is sufficient for the purposes of this application since the specific details of these elements are not pertinent to subject matter of this application.

Any developing material not caught within the developer housing as the developer material falls from the drum is caught by a pan 37 suitably positioned beneath the developer housing. As a supply of developing material accumulates in this pan it is manually removed by an operator and it may be returned to the reservoir in the developer housing.

Positioned next and adjacent to the developing station is the image transfer station D which includes suitable sheet feeding mechanisms adapted to feed sheets of support or transfer material, usually paper, successively to the xerographic drum in registration with the formed xerographic powder image on the xerographic drum. In the embodiment shown, the sheet feeding mechanism includes a chain conveyor 41 carrying a pair of paper grippers 42 in a circuit between sheet receiving and sheet delivery stations, means being provided to actuate the paper grippers to cause the paper grippers to take hold of the front or leading edge of a sheet of support material inserted into the machine and to hold the sheet while traveling to the delivery station and there to release the sheet for discharge from the machine.

In the embodiment shown, a sheet of transfer material fed manually by an operator to a paper gripper 42 is forwarded by the paper gripper into contact with the xerographic drum.

The transfer of the xerographic powder image from the drum surface to the support material is effected by means of a corona transfer device 44 that is located at or immediately after the point of contact between the support material and the rotating drum. The corona transfer device is substantially similar to the corona device 21 that is employed at charging station A, in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

As the paper gripper is advanced by the chain conveyor it will strip the sheet of transfer material from the drum and transport it to a suitable fixing device, such as heat fuser 45, whereat the xerographic powder images previously transferred to the sheet are permanently fixed thereto, suitable rods 46 being provided to guide the trailing edge of a sheet of support material in a path adjacent to the heat fuser. The heat fuser 45 contains suitable electrical heating elements R1, R2 and R3 connected to a suitable source of power as described hereinafter.

Figure 24:
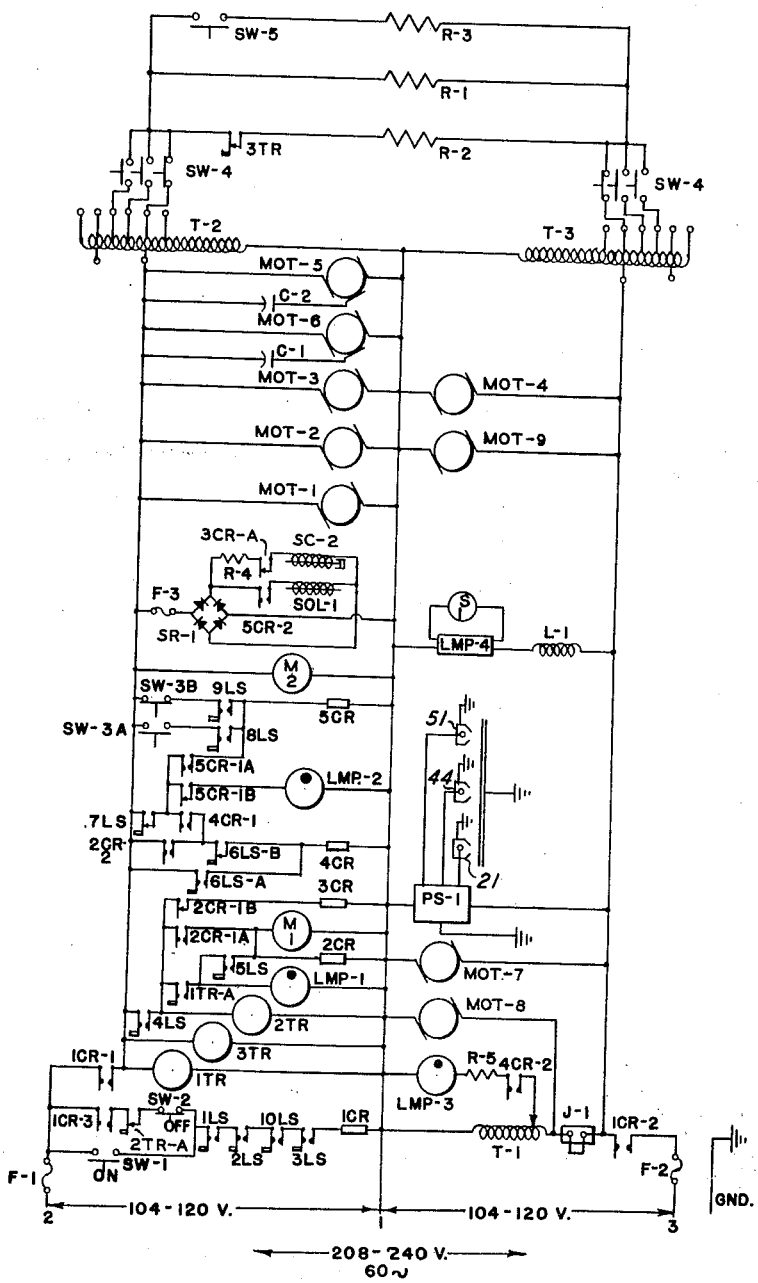
FIG. 24 is a schematic electrical wiring diagram of the xerographic apparatus.
Figure 25:
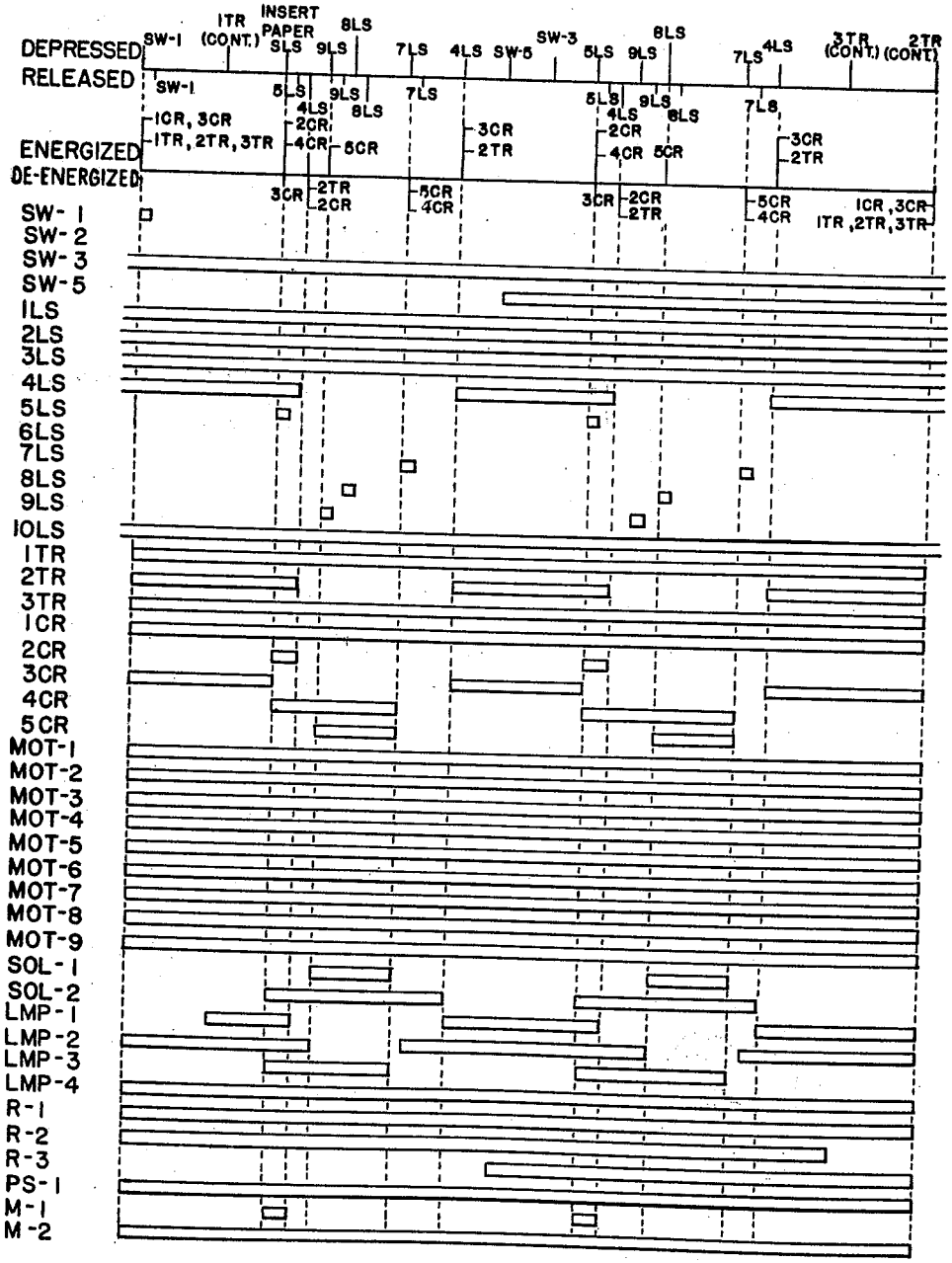
FIG. 25 is a timing chart of the operation of the elements of the xerographic apparatus.

After fusing, the finished copy is discharged from the apparatus at a suitable point for collection. To accomplish this, there is provided a pair of delivery rollers 47 and 48 which receive the sheet from a paper gripper and deliver it to collecting tray 4. Since an electrostatic charge may be retained by the sheet during the transfer process, a motor MOT-1, not shown except schematically in FIG. 24, driven blower 49 is positioned to direct a flow of aeriform fluid between the collecting tray and a sheet delivered thereto, thus in effect forming an air bearing on which the sheet will slide by gravity down the inclined collecting tray 4.

The next and final station in the device is a drum cleaning station E, having positioned therein a corona pre-cleaning device 51 similar to the corona charging device 21, to impose an electrostatic charge on the drum and powder adherent thereto to aid in effecting removal of the powder, a rotatable brush 52 to effect the removal of the residual powder from the drum, and a source of light, such as lamp LMP-4 to flood the drum surface with light to cause dissipation of any residual electrical charge remaining on the xerographic drum.

For collecting powder particles removed from the brush there is provided a dust hood 53 that is formed to encompass approximately two-thirds of the brush area.

For removing dust particles from the brush and dust hood an exhaust duct 54 is arranged to cover a slot that extends transversely across the dust hood 53 and is connected to a filter bag 55 in a filter box 56. Motor-driven fan units 57, connected to the filter box, produce a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor fan unit.

Any residual electrical charges remaining on the xerographic drum is dissipated by light from a fluorescent lamp LMP-4 mounted in a suitable lamp housing 58, a conventional starter being provided for energizing the fluorescent lamp.

The drum, the projection apparatus and the paper conveyor are driven at predetermined speeds relative to each other by MOT-6 through a suitable drive mechanism described hereinafter. The drum continuously, while both the paper conveyor and the projection apparatus are driven intermittently as described hereinafter.

Operation of the paper conveyor is effected by actuation of a limit switch 5LS upon the insertion of a sheet of transfer material into a paper gripper and the operation of the paper conveyor is terminated after a sheet of transfer material has been conveyed from the front of the machine to the delivery rollers when limit switch 4LS is actuated by one of a pair of actuators 38 on the paper conveyor. As the paper conveyor is operated the other actuator 38 thereon contacts limit switches 8LS and 9LS which are used to effect the operation of the projection apparatus as described hereinafter.

The brush cleaner 52 is operated by means of a motor MOT-7, and the developer apparatus 31 including the toner dispenser 36 is operated by means of a motor MOT-5, as previously described. The motor-driven fan units 57 are driven by a pair of motors designated MOT-2 and MOT-3. Another pair of fan units 59, only one of which is shown, are driven by motors MOT-4 and MOT-9, shown schematically in the electrical circuit, and are used to dissipate heat within the cabinet and, in particular, in the areas surrounding the heat fuser 45 and the drum 20. Heat from the projection lamp is dissipated by a motor MOT-8 driven fan unit, shown schematically in the electrical circuit.

*Corona Generating Device*

In general, the electrostatic charging of the xerographic plate in preparation for the exposure step, the electrostatic charging of the support surface to effect transfer and the charging of the xerographic plate to aid in effecting removal of residual toner particles from the xerographic plate by cleaning apparatus are accomplished by means of corona generating devices whereby electrostatic charge is applied to the respective surface.

Although any one of a number of types of corona generating devices may be used, a corona generating device of the type disclosed in Vyverberg Patent 2,836,725 is used in each instance for the corona charging device 21, the corona transfer device 44 and the corona pre-cleaning device 51, each being secured to a suitable support element and connected to an electrical circuit described hereinafter.

Referring now to the figures, there is shown the general ararngement of the xerographic apparatus. For supporting the components of the xerographic apparatus there is provided a frame formed by left-hand plate 5, intermediate plate 6, and right-hand plate 7 connected together and maintained rigidly in spaced parellel relation to each other by suitable tie plates, as for example, channels 8. In the preferred embodiment of the apparatus, this frame assembly is supported within the cabinet by the cabinet frame (not shown). Both the intermediate plate 6 and the right-hand plate 7 have secured thereto extension plates 11 and 12, respectively, for a purpose described hereinafter.

Figure 4:
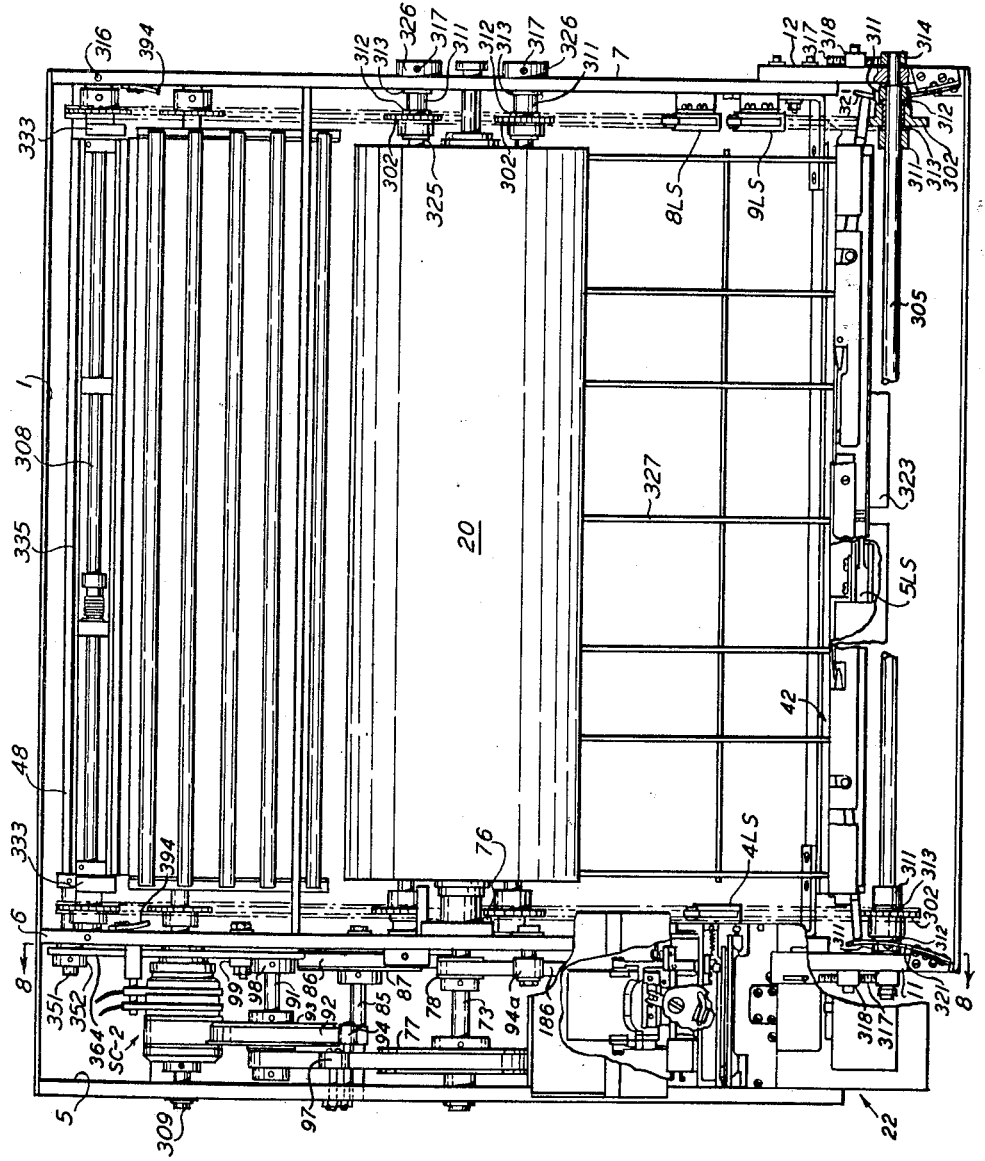
FIG. 4 is a top view of the xerographic apparatus with parts removed for the sake of clarity so that the drive and paper conveyor components of the apparatus are clearly shown.
Figure 5:
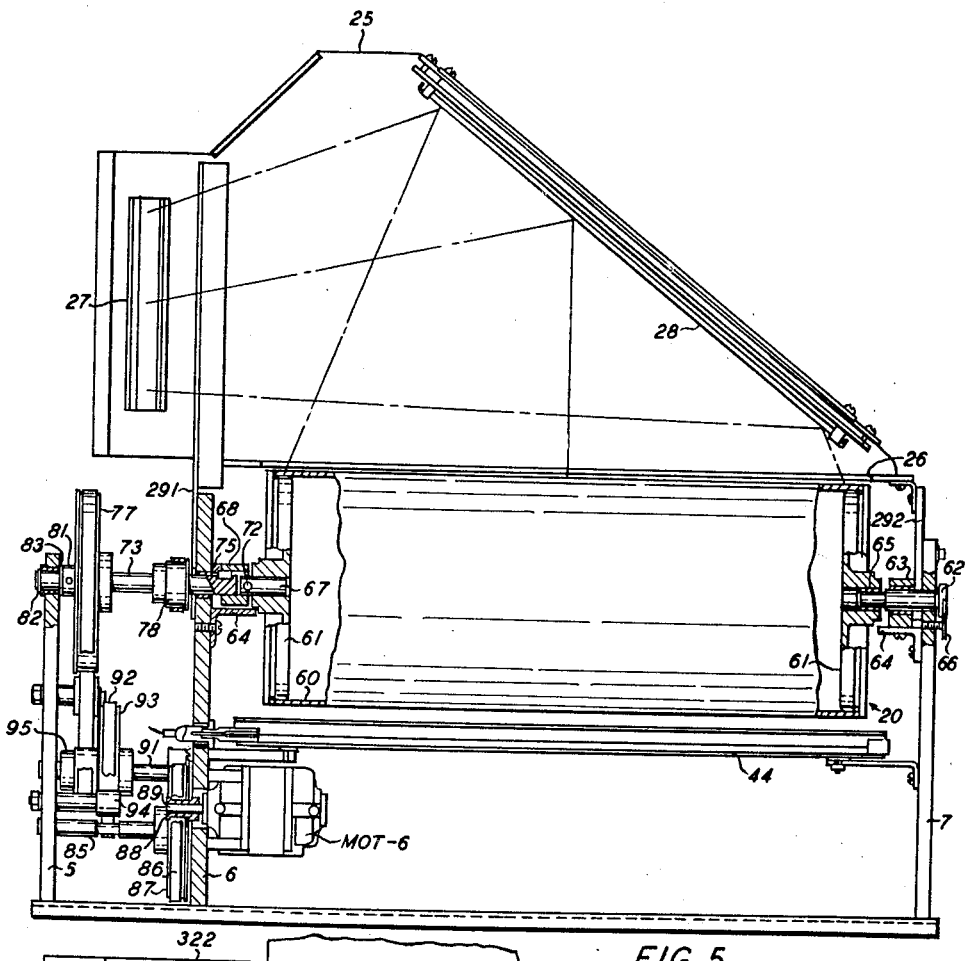
FIG. 5 is a sectional view taken along line 5—5 of FIG. 3.
Figure 7:
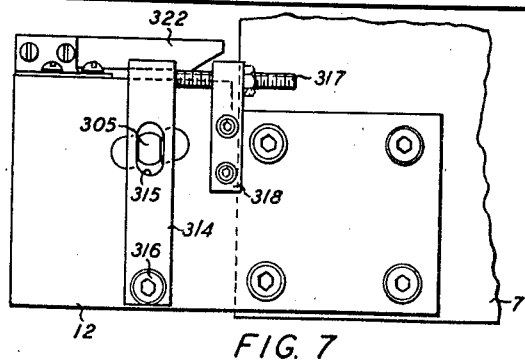
FIG. 7 is an enlarged side view of a frame extension plate and the elements attached thereon.
Figure 6:
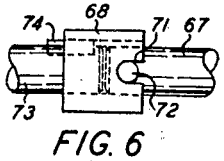
FIG. 6 is an enlarged view of the xerographic drum drive coupling.

As shown in FIGS. 4 and 5 the drum 20, consisting of a cylinder 60 suitably supported by end flanges 61, is movably mounted between the frame plates 6 and 7. To removably support the drum on its right side as seen in FIG. 6, there is provided a removable stud shaft 62 suitably journaled in the right-hand plate 7 and in a bearing block 63 supported by rail 64 secured to plate 7. One end of the stud shaft 62 is also removably journaled in the bearing 65 positioned in the right-hand end flange of the drum, and is prevented from backing out of the drum by means of a lock screw 66, threaded into the plate 7, with the head of the lock screw in interference relationship with the head of the stud shaft 62.

For supporting the other side of the drum the left-hand end flange 61 has secured therein a stud shaft 67. To support the stud shaft 67 and to permit it to be driven from a suitable power source there is provided a coupling 68 adapted to receive the protruding end of the stud shaft 67. The coupling 68 is provided with a groove 71 on a face thereof to receive a drive pin 72 inserted therein and into the aperture on the end of the stud shaft 67. The coupling 68 is secured to a drum drive shaft 73 journaled in the frame plated 5 and 6. Although the key 74 secured the coupling 68 to the drum shaft for rotation therewith, the coupling is free to move axially along the length of the shaft thereby permitting the coupling to be disengaged from the stud shaft 67 after the removal of drive pin 72 whereby this end of the drum may be disengaged from its support for removal from the apparatus. The coupling is normally positioned for engagement with the stud shaft 67 by means of a bearing spacer 75 pivotally secured to the plate 6 by screws 76, and when in position to act as a spacer between the coupling and plate 6, one end of the bearing spacer rests on a second rail 64 attached to plate 6 whereby the bearing spacer is supported out of contact with the drum shaft, 73.

Secured to the drum shaft for rotation therewith is a drum drive pulley 77 and an optical drive pulley 78. Axial alignment of the drum shaft and the pulleys thereon is maintained by means of a collar 81 and thrust washer 83 positioned between drum drive pulley 77 and the right side of frame plate 5, and by a retaining ring 82 positioned in a suitable groove on the left-hand end of the drum shaft, as seen in FIGURE 5. The drum is driven by a main motor MOT-6 through a suitable drive mechanism hereinafter.

*Exposure Mechanism*

The exposure mechanism of the xerographic copier duplicator is adapted to scan the object to be reproduced and to project an enlarged flowing image of the rotating xerographic drum in synchronization with the rotation of the xerographic drum.

Although any suitable exposure mechanism or projector may be used to expose the photoconductive surface of the drum to a radiation image of the copy to be reproduced, an optical scanning mechanism or projector 22 of the type disclosed in the referenced copending Rutkus et al. application, Serial No. 46,435 is used in the preferred embodiment of this invention. In this type of projection apparatus the scanning of the object, which may be either microfilm frames mounted in apertures of data processing cards or roll microfilm, is accomplished by means of a movable carriage supporting the object to be reproduced which is moved relative to an optical system in synchronization with the rotation of the xerographic drum.

As shown, the optical scanning mechanism or projector 22 includes a main projector casing 101 which can be formed as an integral part of the main frame of the apparatus or as a separate element, as shown, secured to the main frame, for supporting a lamp assembly 102, a condenser lens assembly 103, a projector lens assembly 104, in alignment with each other, and a carriage assembly 105 movable at right angles to the axis of the projector lens assembly to permit scanning of copy carried by a suitable copy holder 211 supported by carriage assembly 105.

The lamp assembly 102 includes a projector lamp LMP-3 positioned in a conventional lamp socket (not shown) suitably supported and connected to an electrical circuit described in detail hereinafter, a conventional motor MOT-8 driven blower, not shown, being used to dissipate heat generated by the projection lamp.

The carriage 105 is driven by a pulley 185 connected by belt 186 to pulley 78 on drum drive shaft 73; this drive being connected too the carriage by means of a clutch mechanism, not shown, controlled by solenoid SOL-1 and limit switch 7LS, shown schematically in the electrical circuit.

To permit an operator to view the object to be reproduced on viewing screen 3, a viewing lens 264 and an object mirror 265 can be moved from an inoperative position out of alignment with the projection lens assembly to an operative position in alignment with the projection lens assembly whereby an image of the copy is projected onto an image mirror 286 to be reflected onto the viewing screen. An operator-actuated limit switch 6LS, shown schematically in the electrical circuit, is provided to permit the operator to energize lamp LMP-3.

It is believed that the foregoing description is sufficient for the purpose of this application to show the general operation of the xerographic reproducing apparatus. For further details concerning its specific construction, reference is made to the previously referenced copending Rutkus et al. application, Serial No. 46,435, and to portions of this specification wherein specific elements cooperating with the sheet conveyor mechanism to produce a xerographic reproduction are illustrated and described although they form no part of the instant invention.

*Sheet Feed Mechanism*

A sheet of support material, such as paper, inserted in the machine by an operator through a receiving slot in the front thereof formed by paper guides 13 and 14, is forwarded by an endless conveyor to the xerographic drum adjacent the corona transfer device, whereat a xerographic powder image previously formed on the drum is transferred from the drum to the sheet of support material, the sheet then being forwarded by the conveyor to the heat fuser 45 and then to a set of delivery rollers which deliver the sheet of support material to the collecting tray 4.

Figure 3:
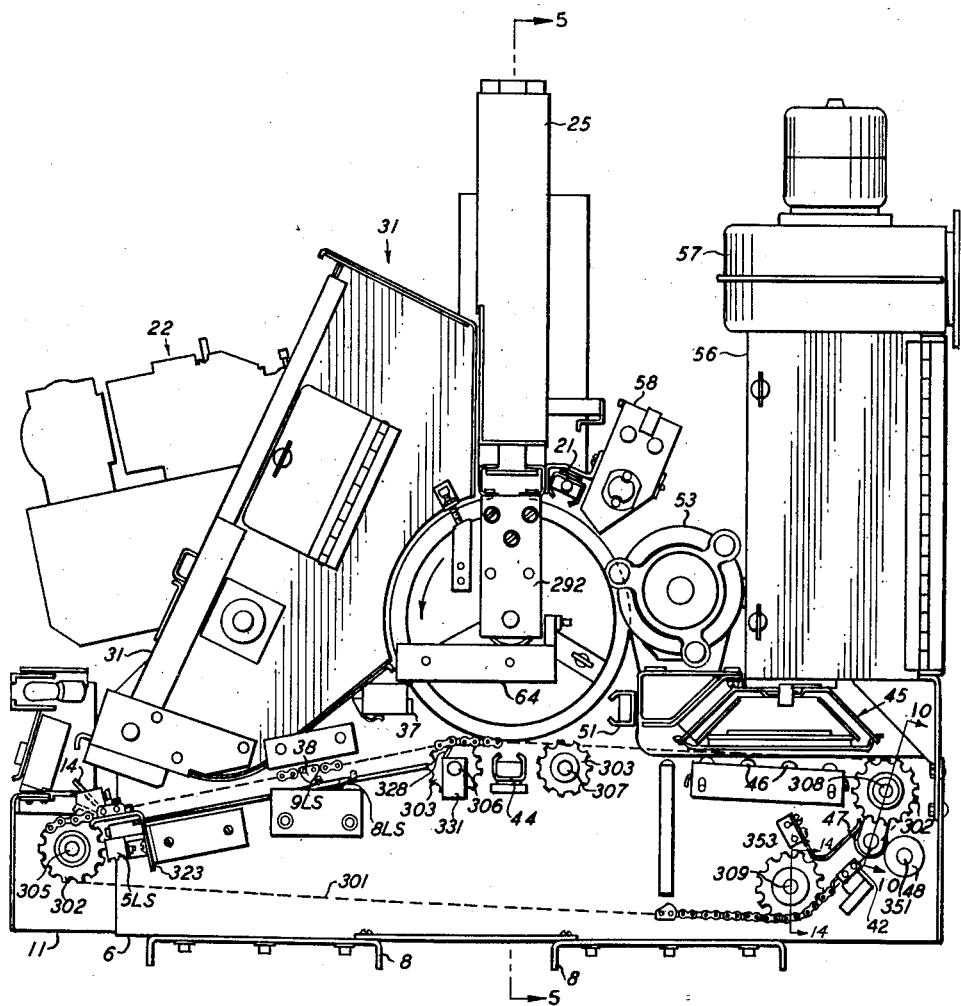
FIG. 3 is a right-hand view of the xerographic apparatus of the invention with the right-hand frame plate removed.

Referring now to the subject matter of the invention, the conveyor 41, as shown in particular in FIGS. 3, 4 and 9, includes two endless roller chains 301 which pass from sprockets 302 carried by front axle 305 over sprockets 303, on axles 306 and 307, which guide the chains in a path tangential to the surface of the drum, then over and around a second set of sprockets 302 on axle 308 down to drive sprockets 304 secured to drive shaft 309 and then back to the sprockets on axle 305. All of these sprockets are positioned on their respective shaft or axles to space the chains apart from each other by a distance greater than the length of the drum.

In the embodiment of the conveyor apparatus disclosed, the chains carry two paper grippers 42 equally spaced from each other along the length of the chain, the paper grippers being positioned on the chain at right angles to the path of travel of the chain for movement therewith and in a circuit between sheet-receiving and sheet-delivering stations. Means are provided to cause the paper grippers to take hold of the front edge of a sheet of transfer material at the receiving station and to hold this sheet while traveling to the delivery station and there to release the sheet for discharge from the machine.

Two paper grippers are used in the preferred embodiment of the machine so that as one paper gripper moves from the receiving station carrying a sheet of transfer material to the delivery station, the other paper gripper will move from the delivery station to the receiving station to be in position to receive a second sheet of transfer material.

Axle 305, which carries a pair of sprockets 302 journaled thereon by means of flanged bearings 312 and positioned axially by suitable thrust washers 313 and collars 311, is movably mounted by means of axle supports 314 pivotally secured by shoulder screws 316 to the extension plates 11 and 12, the axle having flattened recessed ends that are slidably received in slots 315 in the axle supports. Suitable elongated slots are formed in the extension plates to permit longitudinal movement of the axle whereby the tension of the roller chains is adjusted by manipulation of the adjusting screws 317 threaded through the blocks 318 secured to the extension plates.

Gripper actuators 321 and 322 are positioned on the extension plates 11 and 12, respectively, for effecting operation of the paper grippers 42 to receive a sheet of transfer material at the receiving station of the conveyor. A gripper bar support plate 323 is also secured to the extension plates at the sheet-receiving station to limit downward deflection of the paper gripper as a sheet of transfer material is inserted therein, the gripper bar support plate carrying a limit switch 5LS used to control the operation of the conveyor as described hereinafter.

Sprockets 313 are journaled by means of flanged bearings 312 on axles 306 and 307, axial alignment of the sprockets being maintained by means of thrust washers 313, collars 311 and by retaining rings 325, the latter being positioned in suitable grooves, formed in the axles. The axles extend through slots in plates 6 and 7 into suitable openings in axle support blocks 326 attached to the frame plates whereby the axles are positioned and retained by means of screws 317 so that the pitch diameter of the sprockets 303 carried by these axles are positioned in a plane tangential to the xerographic drum.

To guide the trailing edge of a sheet of transfer material carried by a paper gripper, a wire grid 327 is positioned between axle 305 and axle 306, the wire grid being attached at one end to the gripper support plate 323 and at its other end to axle 306.

As a sheet of transfer material is forwarded from the receiving station to the delivery station the portion of the sheet not firmly held by a paper gripper is arched upward into contact with the drum by a guide 328 attached to the guide support bar 331 loosely mounted on axle 306. The guide 328 is formed as a thin flexible member to permit the upper portion of the guide to be deflected by a paper gripper as it passes thereover. The guide support bar is constructed with a bore located above its center so that it will have a pendulous action as loosely mounted on the axle 306.

As the sheet of transfer material is arched toward the drum it is electrostatically tacked into the drum whereby the transfer material moves synchronously with the drum while in contact therewith.

Axle 308, fastened at its ends in the plates 6 and 7 by screws 316, rotatably carries the second set of sprockets 302 thereon, the sprockets being supported on the axle inboard of the frame plates by flanged bearings 312. The axle 308 also carries a pair of idler roll supports 333 for the idler delivery roller 47 journaled therein by bearings 332, the idler roll supports being spaced from the sprockets by collars 334, and a paper guide roll, generally designated 335, of the type disclosed in co-pending application, Serial No. 46,464, filed concurrently herewith on August 1, 1960, in the name of Rutkus et al.

The paper guide roll 335 is used in the preferred embodiment of the sheet conveyor shown to permit the use of a conveyor having a shorter length of travel to be used in the preferred embodiment of the machine. As previously described the transfer of the xerographic powder image from the xerographic drum to a sheet of transfer material is accomplished by means of an electrostatic field created by a corona discharge device.

In operation, the electrostatic field created by the corona discharge device is effective to tack the transfer material electrostatically to the drum surface, whereby the transfer material moves synchronously with the drum while in contact therewith. As the paper gripper carrying the sheet of transfer material moves away from the xerographic drum to the delivery station it pulls the sheet of transfer material away from the surface of the drum against the electrostatic forces tending to tack the paper to the drum. On a continuous straight line path of the paper gripper the sheet of transfer material would be uniformly pulled away from the surface of the drum in a line substantially parallel to the path of travel of the paper gripper. This, of course, would require the use of a conveyor having a straight line run from the drum of a length at least equal to the length of the largest sheet of transfer material to be transported by the conveyor.

To reduce the overall size of the xerographic apparatus, a conveyor is used in the machine which has a straight run from the drum of a length less than the length of the largest sheet to be transported by the conveyor. However, with a conveyor of this size, as seen in FIG. 3, it is apparent that one end or the trailing edge of a relatively long sheet of transfer material could still be in contact with the drum while its leading edge, as carried by the paper gripper, could be traveling around the axle 308. It can be readily seen that, without a paper guide roll mounted on the axle 308, as the paper gripper passes around the axle the length of travel of the sheet of transfer material would be shortened, thereby permitting the trailing edge of the sheet of transfer material to be carried up and around the drum by the tacking action of the transfer material to the drum to a point where the top surface of a sheet of transfer material would contact other elements of the xerographic machine positioned above the conveyor belt. If this is permitted to occur the xerographic powder images, carried by the upper surface of the transfer material by electrostatic attraction only, prior to fusing, would be smeared or completely brushed off as the transfer material contacted these elements.

To overcome this problem to permit use of a smaller conveyor assembly, a paper guide roll 335 is used to guide the trailing portion of a sheet of transfer material around the axle at a speed equal to the lineal speed of the paper grippers. Since the lineal speed of travel of the paper gripper is equal to the peripheral speed of the xerographic drum, the sheet of transfer material is pulled from the drum at a constant rate whereby it is prevented from being carried around by the drum into contact with other elements positioned adjacent to the drum.

In the embodiment shown, see especially FIGS. 9, 10 and 11, the paper guide roll 335 consists of a pair of end spacers 336 and a pair of spacers 337 formed as segments of a circle. A guide plate 338 is secured as by screws 341 to the peripheral surface of these spacers 336 and 337 whereby the guide plate forms an elongated single guide for a sheet of transfer material, the radius of the peripheral surface of the guide being equal to the pitch radius of the sprockets 302 for the purpose to be described hereinafter. The end spacers are provided with bearings 342 so that this assembly of guide plate and spacers if free to rotate with respect to axle 308. The rise of the chord of the spacers is such that the chord surface of each spacer is positioned below the path of travel of the paper gripper bar carried by the chains, or stated in a different manner, the rise of the spacers is slightly greater than the distance between the center line of the chain to the bottom of the paper grippers.

The chord portions of the spacers 336 and 337 are yieldingly biased into a position parallel to the straight line path of travel of the roller chains as it approaches axle 308 by means of a torsion spring 344. The torsion spring which encircles axle 308 is attached at one end to a spring clamp 345 adjustably secured to the axle by screw 346 and at its other end the torsion spring is attached to a counterbalance rod 347 projecting through arcuate slots provided in the spacers and secured in an adjustable position by nuts 348. A thrust washer 313 encircles the axle between the torsion spring 344 and the left-hand spacer 337 as seen in FIG. 10 to prevent axial expansion of the torsion spring.

Each end spacer 336 is provided with a pin 348 positioned on the chord of the spacer in interference relation with the paper grippers in their path of travel, so that, as a paper gripper travels over the chords of the spacers it will contact the pins, as seen in FIG. 12, to rotate the paper guide roll as the paper gripper travels around the axle until the paper gripper slides off the pins as it continues in its path as defined by the travel of the roller chains. Rotation of the paper guide roll around axis of axle 308 brings the peripheral surface of the paper guide roll into position, as shown schematically in FIG. 13, to guide the sheet carried by the paper gripper in a path corresponding to the path of travel of the paper gripper around axle 308.

While the sheet is being pulled at one end by a paper gripper or by the delivery rolls described hereinafter, and held back at its other end by its tacking force onto the drum, the paper guide roll will remain rotated in the position shown in FIG. 13 by the frictional contact of the sheet as it moves thereover, it being understood that the biasing action of the torsion spring should be such that it will rotate the paper guide roll to its normal position as shown in FIG. 12 while still permitting the paper guide roll to be rotated against the biasing action of this spring by a paper gripper and to be held rotated in this position by the frictional contact of sheet as it is pulled tight around the paper guide roll.

As the trailing edge of a sheet is pulled off the drum, the sheet is no longer pulled tight over the peripheral surface of the paper guide roll permitting it to be returned to its normal position by the biasing action of torsion spring 344.

When the paper gripper leaves the paper guide roll 335 it travels between the delivery rollers 47 and 48 to a position intermediate the delivery rollers and the drive shaft 309 where the paper gripper is actuated by cams 394 to release the sheet for discharge from the machine by these delivery rollers.

Delivery roller 48, which is a driven roller, is journaled at its ends in idler roll supports 333 rotatably supported on axle 308, the delivery roller 47 being yieldingly biased against the delivery roller 48 by means of springs 353 mounted on frame plates 6 and 7 so that the delivery roller 47 is driven by frictional engagement of rubber O-rings 354 mounted thereon with delivery roller 48 or with a sheet of material interposed between said rollers. The springs 353 permit the delivery roller 47 to be forced away from delivery roller 48 as it is contacted by a paper gripper 42 to permit the paper gripper to pass between these rollers.

The roller chains carrying the paper grippers are driven by the drive sprockets 304 secured to drive shaft 309 rotatably journaled in frame plates 5, 6, and 7, as shown in FIGS. 9 and 14. Drive shaft 309 is maintained axially in position at one end by a collar 311 and thrust washer 313, and its other end by thrust washer 313 and retaining ring 325, the latter being inserted in a suitable groove formed in the drive shaft. Drive shaft 308 is driven by sprocket 355 through a conventional magnetic clutch SC-2, for example, a model C-60 clutch manufactured by Simplatrol Products Corp., Worcester, Massachusetts. The magnetic clutch includes two clutch plates 357 and 358 and an electromagnet shown schematically in the electrical circuit of FIG. 24, as clutch SC-2.

Clutch plate 357 is secured to the drive shaft 309 for rotation therewith by key 361 and screws 316 threaded in the hub of clutch plate 357, while clutch plate 358 is journaled by suitable bearings on the drive shaft and carries a clutch adapter 363 supporting sprocket 355 driven by chain 364 from a suitable drive mechanism described hereinafter. Thus, clutch plate 358 is free to rotate about the axis of the drive shaft while clutch plate 357 remains stationary due to the friction of the elements attached thereto.

The magnetic clutch is connected to a suitable source of power, as described hereinafter, through brushes 365 bearing on suitable collector rings on clutch plate 358, the brushes being secured to and insulated from the frame plate 6 by bracket 367.

The two paper grippers 42 are of like construction and for simplicity the following description relates only to one set.

As shown in detail in FIGS. 15 to 23, inclusive, the paper gripper 42 consists of a gripper bar housing in which a right-hand gripper bar 374 and a left-hand gripper bar 375 are positioned within the housing to coact with a portion of the housing to grip a sheet of transfer material.

The gripper bar housing includes a bottom panel 376 and a top panel 377 held together in spaced parallel relation to each other as by screws 378 threaded into center spacer 381 and end spacers 382 secured as by welding to the bottom panel and top panel, respectively.

The bottom panel which is of a length to extend transversely between the two roller chains has up-turned end extensions 383 with suitable apertures formed therein to coincide with the pitch of the chains whereby the bottom panel is adapted to be attached to the chains 301 by means of elongated chain pins 384 of the roller chains. The bottom panel which is substantially U-shaped has a longitudinal rear lip 385 (in terms of the direction of chain travel) which is of a length greater than the length of the leading edge of a sheet of transfer material on which xerographic powder images are to be transferred.

The bottom panel has an aperture 389 in the center thereof to receive the actuator lever of a limit switch 5LS when positioned thereover for a purpose described hereinafter.

The right-hand gripper bar 374 and the left-hand gripper bar 375 are actuated by means of a right-hand lever 386 and a left-hand lever 387, respectively, each being pivotally secured in the gripper bar housing by a lever pivot pin 388 positioned in suitable apertures in the bottom panel 377 and secured thereto as by silver soldering. Each of the lever pivot pins 388 has a threaded aperture therein to receive a screw 378 passing through the top panel.

The right-hand lever 386 which is pivotally supported near its center by the lever pivot pin 388 on the right-hand side of the gripper assembly is also pivotally secured near one end to the right-hand gripper bar by a dowel pin 391 held in place by the top and bottom panels. The other end of this lever extends beyond the right-hand end of the gripper bar housing and is suitably formed to extend above the upturned end of the bottom panel whereby it may be actuated by cam 322 or cam 394 to effect movement of the right-hand gripper bar away from the turned-up lip of the bottom panel.

The left-hand lever 387 which pivotally supported near its center in a similar manner to the right-hand lever by a lever pivot pin 388, is also pivotally secured near one end to the left-hand gripper bar by a second dowel 391. The other end of the left-hand lever extends beyond the left-hand end of the gripper bar housing to be actuated by cam 321 or cam 394 to effect movement of the left-hand gripper bar away from the turned-up lip of the bottom panel.

The right-hand gripper bar and the left-hand gripper bar cooperate with the lip of the bottom panel to grip a sheet of transfer material inserted therebetween to enable the sheet of transfer material to be transported to the machine, these gripper bars being normally biased toward the lip of the bottom panel by means of a leaf spring 392 having its center portion positioned between the spacer 381 and the front turned-up edge of the bottom panel, one end of the spring contacting the right-hand lever and the opposite end of the spring contacting the left-hand lever to bias the gripper bars against the lip, or against the lip of the bottom panel with a sheet of transfer material interposed therebetween.

The right-hand lever and the left-hand lever of the gripper bars when actuated by the cams are pivoted around the pins 388 to force the gripper bars toward the front of the gripper bar housing against the tension of spring 392, a pair of stops 393 being positioned to limit the forward travel of the gripper bars. To prevent binding of the gripper bars against the pivot pins each of the gripper bars is formed with a suitable notch 395 to permit the gripper bars to slide relative to the gripper pins.

In the preferred embodiment of the apparatus disclosed, the drum 20, the scan mechanism of the optical projecter 22, and the sheet conveyor 41 including the delivery roller 48 are all driven by a main drive motor MOT-6 through the first and second speed reduction mechanism whereby these elements are driven at predetermined speed relative to each other.

Shaft 85, of the first speed reduction unit, is journaled in frame plates 5 and 6 and operatively connected to motor MOT-6 by belt 86, which runs on pulleys 87 and 88 fixedly mounted on shaft 85 and on the shaft 89 of MOT-6, respectively; the motor shaft 89 extending through a suitable aperture in frame plate 6 to which the motor MOT-6 is adjustably secured.

Shaft 91, of the second speed reduction unit, is also journaled in frame plate 5 and 6 and is operatively connected to shaft 85 by belt 92, which runs on pulley 93 fixedly mounted on shaft 91 and on shaft 85 which has an undercut portion thereon serving as a pulley. Tension on belt 92 is maintained by idler 94 adjustably secured to frame plate 5.

Shaft 91 also has secured thereon pulley 95 which is connected by belt 96 to the drum drive pulley 77 fixedly secured on drum drive shaft 73, belt tension being maintained by idler 97 adjustably secured to frame plate 5. Sprocket 98 also fixedly connected to shaft 91 is used to drive the delivery roller 48 and the sheet conveyor by means of chain 364, the chain traveling from sprocket 98 over to and around sprocket 352 on delivery roller shaft 351, back over sprocket 355 secured to clutch plate 358, down and around idler sprocket 99 adjustably secured to frame plate 6 and back up to sprocket 98.

The optical scan mechanism is driven by means of belt 186 connecting the optical drive pulley 185 to the pulley 78 fixedly mounted on shaft 175 and drum drive shaft 73, respectively, the belt 186 being properly tensioned on these pulleys by idler pulley 94 adjustably secured to frame plate 6.

*Fuser*

The developing materials used to form the powder images are specifically designed to permit them to be fixed to support material either by heat fusing or vapor fixing techniques, that is, the individual particles of resin (toner) soften and coalesce when heated or plasticized by solvent so that they become sticky and readily adhere to the support material. Thus, although any suitable fusing device may be used, in the embodiment shown, a heat fuser of the type disclosed in copending Eichler application, Serial No. 797,143, filed March 4, 1959, now Patent No. 2,965,868 is used to supply heat by means of resistance elements for fusing the powder images. In the embodiment shown the fuser contains three resistance elements designated R1, R2 and R3 for the purpose described hereinafter.

*Machine Operation*

A clearer understanding of the operation of the machine can best be obtained by reference to the schematic wiring diagram, the sequence of operation chart, and the following description.

Before the xerographic apparatus may be actuated, the doors of the cabinet must be closed to actuate the interlock switches 1LS, 2LS, 3LS and 19LS, mounted on the cabinet frame, not shown. These interlock switches are used so that the machine may be operated only when the doors of the cabinet are closed. This provision is made, not only from the standpoint of safety, but also to ensure proper circulation of air throughout the interior of the machine to dissipate heat generated by the apparatus. A paper gripper 42 must also be in position to receive a sheet of support material. As described hereinafter, the switch actuator 38 on the paper conveyor contacting the end-of-cycle limit switch 4LS stops the paper conveyor to position a paper gripper in position at the receiving station to receive a sheet of support material.

The entire assembly of the apparatus is energized by momentarily closing main power switch SW-1 connecting the assembly to a suitable source of power, such as a commercial 220-volt alternating current outlet. Switch SW-1 is closed by depressing the button on the control panel 2 marked ON.

Upon closure of switch SW-1, control relay 1-CR is energized to close its contacts 1CR-1, 1CR-2, and 1CR-3. With the closure of contact 1CR-3, the switch SW-1 may be released, the circuit then being maintained through the normally closed contact 2TR-A of thermal timer 2TR, and normally closed switch SW-2 to supply power to the control relay 1CR to keep its contacts closed. Switch SW-2 is controlled by the button on the control panel marked OFF. At the same time transformer T-1, T-2, and T-3, clock meter M-2 and the power supply PS-1 are energized, the latter supplying high voltage power to the corona charging device 21, the corona transfer device 44 and the corona pre-cleaning device 51 to energize these units. The clock meter M-2, is mounted on any suitable location on the cabinet frame, not shown, and is used to indicate the total elapsed operating time of the machine. Fluorescent lamp LMP-4 is also energized through a conventional starter S-1 and ballast L-1 circuit.

Switch SW-4, which is a mechanically interlocked three-position push button switch marked HI, MED and LOW, is used to control the voltage applied to the resistance elements of the heat fuser. Switch SW-4, not shown, except schematically, is mounted in a suitable location on the apparatus accessible by the operator. As shown, the different contacts of switch SW-4 are connected to different secondary taps of the multiple tap transformers T-2 and T-3 to obtain preselected voltages to the resistance elements R-1, R-2 and R-3 of heat fuser 45.

As transformers T-2 and T-3 are energized, power is supplied directly to the resistance element R-1, which is the normally used heating element of the fuser, and through the normally closed contact 3TR-A of thermal timer 3TR to the resistance element R-2. Resistance element R-2 is used as an auxiliary heating element to aid in bringing the heat fuser up to its normal operating temperature rapidly. Thermal timer 3TR, which is also energized upon the closure of switch SW-1 through the then closed contact 1CR-1, is preferably a three-minute timer, that is, three minutes after it is energized while at ambient room temperature it will heat up sufficiently to open its contact 3TR–A thereby de-energizing resistance element R–2.

If the machine is operated for a sufficient period of time to permit the heat fuser to be brought up to its normal operating temperature and then the machine is shut down there will be a considerable time delay before the heat fuser will cool sufficiently to reach ambient room temperature. Now if the machine is again energized and the resistance element R–2 is again energized for a three-minute interval, there would be sufficient heat capacity left in the fuser so that with the additional heat supplied by resistance element R–2 the fuser would become overheated to the extent that a support material such as paper passing therebeneath would be scorched. To prevent this, a thermal timer 3TR is chosen with a characteristic curve such that it too will have an extended period of time in which to cool down sufficiently to close its contact 3TR–A. With a timer of this type it is then possible to re-energize the machine after a brief shutdown interval without overheating the fuser because a three-minute cycle will no longer be necessary to heat up the timer 3–TR to open its contact 3TR–A.

The third resistance element R3 can be connected by an operator, if required, in order to fuse powder images on card stock or heavy transfer material for which a higher heat output is necessary. For this purpose there is provided a switch SW5, suitably positioned on the apparatus for access by the operator.

Simultaneously with the closure of switch SW–1 the following motors are energized: The main drive motor MOT–6 for driving the drum through the various processing stations; a brush cleaner motor MOT–7 suitably connected for rotating the cleaning brush 52; the motor MOT–5 for operating the developer conveyor 34 and the toner dispenser 36; and the motors MOT–1 for blower 49, motors MOT–2 and MOT–3 for fan units 57, motors MOT–4 and MOT–9 for fan units 59; and motor MOT–8 for the blower, not shown, used to dissipate heat generated by the projection lamp.

As contact 1CR–1 is closed a 20-second timer 1TR is energized as is the 2-minute shutdown thermal timer 2TR. Timer 2TR if left energized for 2 minutes would heat sufficiently to open its contact 2TR–A to de-energize the machine circuit. Control relay 3CR energized through normally closed contact 2CR–1B of control relay 2CR at this time causes its normally closed contact 3CR–A to be opened thereby preventing the solenoid SOL–2 of the clutch drive to be energized. At this time, limit switch 7LS and contact 5CR–1B of control relay 5CR, which are normally closed, permit the reload lamp LMP–2 to be energized at this time.

Twenty seconds after the closure of switch SW1, the thermal timer 1TR is heated sufficiently to close its contact 1TRA thereby permitting the print lamp LMP–1 to be energized, thus indicating to the operator that the machine is in readiness to make a xerographic reproduction.

Upon the insertion of a sheet of support material in a paper gripper 42, the leading edge of the support material will trip the actuator of the limit switch 5LS to thereby energize control relay 2CR. As control relay 2CR is energized its contacts 2CR–1A and 2CR–2 are closed and its normally closed contact 2CR–1B is opened.

As contact 2CR–1A is closed a meter M1 (not shown except schematically in FIG. 24), used to record the number of reproductions made, is energized, while closure of contact 2CR–2 permits the control relay 4CR to be energized through normally closed limit switch 6LS–B on the optical assembly. With power applied to control relay 4CR its holding contact 4CR–1 is closed, as is its contact 4CR–2 to energize the projector lamp LMP–3 through resistor R5 for projecting a light image onto the drum.

With the closure of contact 2CR–1A contact 2CR–1B is opened thereby de-energizing control relay 3CR closing its contact to permit the clutch SC–2 to be energized through resistor R4 and a conventional selenium rectifier circuit SR–1. Clutch SC–2 when energized connects the paper conveyor through a previously described drive mechanism to motor MOT–6. As the chains on the conveyor are rotated, the paper gripper bar levers slide off their respective actuating cams 321 and 322 to permit the paper to be gripped by the gripper bar, and as it moves away, the paper is conveyed out of contact with the limit switch 5LS, permitting its release. At this time, control relay 2CR remains energized through its own holding circuit previously described. As the chain on the paper conveyor continues to move, the actuator on the chain is withdrawn from the end-of-scan limit switch 4LS to release it, thereby breaking the circuit to the timer 2TR, lamp LMP–1 and meter M–1.

Referring now to switch SW–3, this is a mechanical interlock two-position push button switch used to connect the circuit either to a limit switch 8LS or a limit switch 9LS, depending on which way the switch S–3 is thrown. The only difference between these two limit switches is that they are positioned to be tripped a fixed distance of time with respect to each other from the start of operation. If the switch 8LS is placed in the system by closure of switch contact SW–3A the transfer material is forwarded to the drum to place the leading edge of the transfer material about ¾" in advance of the leading edge of the copy image. This is used for duplicating masters or other large sheets where it is desirable to leave a ¾" edge so that the master can be bound into a press. Normally, as shown, the limit switch 9LS is used through closure of contact S–3B because the most common transfer material is paper.

As the chain continues to move, the actuator 38 thereon will momentarily trip first the limit switch 9LS and then the limit switch 8LS. As the contact of the limit switch 9LS is closed by the actuator control relay 5CR is energized to close its contact 5CR2 to supply power to solenoid SOL–1. As solenoid SOL–1 is energized, its plunger forces the pressure roller 195 attached thereto, through linkage previously described, against the scan bar 127 of the film carriage to force it into frictional contact with the continually rotating roller 128 to effect a scan cycle. As an image is scanned an electrostatic latent image is formed on the drum, developed, and then as this portion of the drum passes through the transfer station the xerographic powder image is transferred from the drum to the sheet of transfer material which initiated the xerographic operation. The paper is fed by the paper conveyor in timed relation to the movement of the drum so that the paper is delivered to the drum to coincide with the image formed thereon.

As the normally closed end-of-scan limit switch 7LS on the carriage 105 contacts the end-of-scan limit plate 152, the switch is depressed to break the circuit to control relay 4CR and relay 5CR thereby de-energizing solenoid SOL–1 and lamp LMP–3. With the release of the solenoid SOL–1, the carriage of the optical scanning mechanism is free to be returned to its starting position by the biasing action of the return spring 143, thereby releasing limit switch 7LS to re-energize lamp LMP–2 through the closed contact 5CR–1B.

In the meantime the paper conveyor will forward the paper with the transferred xerographic powder image thereon to the heat fuser where the powder forming the image on the paper is permanently fixed thereto, and then the paper is forwarded to the delivery rollers 47 and 48 which grip the paper as it is released by the gripper bar to discharge the paper into the tray.

The chain conveyor will continue to operate until an actuator 38 thereon depresses the end-of-scan limit switch 4LS. As the end-of-scan limit switch 4LS is closed, timer 2TR and control relay 3CR are energized, the latter thereby opening its normally closed contact 3CRA to de-energize clutch SC–2 which disengages the drive to the paper conveyor stopping it with a gripper bar thereon in position over limit switch 5LS to receive the next sheet of support material. At the same time lamp LMP–1 is energized to indicate to the operator that the machine is ready to start another xerographic processing cycle.

At this time the operator may insert another sheet of paper to initiate another reproduction cycle starting with the closure of limit switch 5LS as just described. If so desired he may also wish to make a reproduction on a duplicating master in lieu of paper as a support material. To do this switches SW–3 and SW–5 must be depressed to their Master position in preparation for making a master reproduction. Switch SW–5 is a mechanically interlock two-position push button switch used to connect the resistance element R–3 into the circuit. This additional resistance element is required because it is necessary to supply more heat to fuse a powder image on a duplicating master than on an ordinary sheet of paper.

As previously described, switch SW–3 when pushed into the Master position opens contact SW–3B and closes contact SW–3A which connects limit switch 8LS in the circuit. The machine is now set to make a master in the same manner described above in relation to making xerographic reproductions on paper.

If, on the other hand, the machine is not used for a period of two minutes, the timer 2TR heats sufficiently to open its contact 2TR–A to de-energize the entire circuit. The timer 2TR requires a two-minute interval which is specifically chosen so that if the operator does not use the machine for a period of two minutes the machine will automatically shut down. The operator will not normally push the OFF button or switch SW–2; he will just stop using the machine and it will turn itself off. However, the two-minute interval gives the operator sufficient time to change copies to effect other supervisory operations before automatic shut-off. In the event of a malfunction, the OFF switch SW–2 is provided on the control panel to enable the operator to stop the machine immediately.

Limit switch 6LS, previously described only in relation to its normally closed contact 6LS–B is a switch normally actuated by the operator to enable him to view a frame or frames on a web of microfilm without necessarily initiating a complete xerographic reproduction cycle. Thus, if the operator wishes to scan the web of microfilm to locate a particular frame desired and then to center this frame on the film carriage, the operator need only depress the limit switch to close its contact 6LS–A to energize the projector lamp LMP–3 to permit the operator to view the projected image on the viewing platen 3. Closure of the contact 6LS–A energizes lamp LMP–3 through control relay 4CR and its content 4CR–2.

Referring again to the subject matter of the invention, it is apparent that a sheet conveyor mechanism having a sheet gripper mechanism of the type disclosed can be designed to accommodate large size sheets while still permitting the conveyor to operate effectively on smaller size sheets.

Sheets of paper of any size are held uniformly along substantially the entire leading edge of the sheets because of the novel arrangement of the gripper bars within the gripper bar housing.

While the invention has been described with reference to the structures disclosed herein, it is not confined to the details set forth, and this application is intended to cover such modifications or changes as may come within the purposes of the improvements or the scope of the following claims.

What is claimed is:

1. A sheet conveyor including two endless belts, pulley means supporting said two endless belts for travel in unison in two spaced parallel planes, a gripper bar housing having a paper-engaging lip, means connecting said gripper bar housing to said endless belts along a line perpendicular to the two spaced parallel planes of travel of said endless belts, a first gripper bar and a second gripper bar movably supported in said gripper bar housing, spring means positioned in said gripper bar housing to normally bias said first gripper bar and said second gripper bar into contact with said paper-engaging lip of said gripper bar housing, a first lever pivotally secured at one end to said first gripper bar and intermediate its ends to said gripper bar housing, with its opposite end extending beyond said gripper bar housing, a second lever pivotally secured at one end to said gripper bar and intermediate its ends to said gripper bar housing with its opposite end extending beyond said gripper bar housing, and cam means positioned adjacent said endless belts to be in interference position with said first lever and said second lever as said gripper bar housing is moved by said endless belts whereby said first lever and said second lever will be actuated to force said first gripper bar and said second gripper bar, respectively, out of engagement with said paper-engaging lip of said gripper bar housing.

2. A sheet conveyor including two endless belts, pulley means supporting said two endless belts for travel in unison in two spaced parallel planes, a gripper bar housing having a paper-engaging lip, means connecting said gripper bar housing to said endless belts along a line perpendicular to the two spaced parallel planes of travel of said endless belts, a first gripper bar and a second gripper bar movably supported in said gripper bar housing, a first lever pivotally secured at one end to substantially the center of said first gripper bar, and intermediate its ends to said gripper bar housing, with its opposite end extending beyond said gripper bar housing, a second lever pivotally secured at one end to substantially the center of the said second gripper bar, and intermediate its ends to said gripper bar housing with its opposite end extending beyond said gripper bar housing, for effecting parallel motion of said first gripper bar and said second gripper bar; spring means mounted in said gripper bar housing to contact said first lever and said second lever for biasing said first gripper bar and said second gripper bar, respectively, into contact with said paper-engaging lip of said gripper bar housing, and cam means positioned adjacent said endless belts to be in interference position with said first lever and said second lever as said gripper bar housing is moved by said endless belts whereby said first lever and said second lever will be actuated to force said first gripper bar and said second gripper bar, respectively, out of engagement with said paper-engaging lip of said gripper bar housing.

3. A sheet gripper including a gripper bar housing having a paper-engaging lip, means for connecting said gripper bar housing to a conveyor, a first gripper bar and a second gripper bar movably supported in said gripper bar housing, spring means mounted in said gripper bar housing to normally bias said first gripper bar and said second gripper bar into contact with said paper-engaging lip of said gripper bar housing, a first lever pivotally secured at one end to said first gripper bar and intermediate its ends to said gripper bar housing, with its opposite end extending beyond said gripper bar housing, a second lever pivotally secured at one end to said second gripper bar and intermediate its ends to said gripper bar housing with its opposite end extending beyond said gripper bar housing.

4. A sheet gripper including a gripper bar housing having a bottom panel and a top panel secured in spaced parallel relation to each other, said bottom panel having an up-turned paper-engaging lip, means for connecting said gripper bar housing to a conveyor, a first gripper bar and a second gripper bar supported in said gripper bar housing for movement in a plane between said bottom panel and said top panel, spring means mounted in said gripper bar housing to normally bias said first gripper bar and said second gripper bar into contact with said up-turned paper-engaging lip of said gripper bar housing, a first lever pivotally secured at one end to said first gripper bar and intermediate its ends in said gripper bar housing, with its opposite end extending beyond said gripper bar housing, a second lever pivotally secured at one end to said second gripper bar and intermediate its ends to said gripper bar housing with its opposite end extending beyond said gripper bar housing.

5. A sheet conveyor including two endless belts, pulley means supporting said two endless belts for travel in unison in two spaced planes, a gripper bar housing including a bottom panel and a top panel secured in spaced relation to each other, said bottom panel having an up-turned paper-engaging lip, means connecting said gripper bar housing to said endless belts along a line perpendicular to the two spaced planes of travel of said endless belts, a first gripper bar and a second gripper bar movably supported in said gripper bar housing, spring means positioned in said gripper bar housing to normally bias said first gripper bar and said second gripper bar into contact with said up-turned paper-engaging lip of said gripper bar housing, a first lever pivotally secured at one end to said first gripper bar and intermediate its ends to said gripper bar housing, with its opposite end extending beyond said gripper bar housing, a second lever pivotally secured at one end to said gripper bar and intermediate its ends to said gripper bar housing with its opposite end extending beyond said gripper bar housing, and cam means positioned adjacent said endless belts to be in interference position with said first lever and said second lever as said gripper bar housing is moved by said endless belts whereby said first lever and said second lever will be actuated to move said first gripper bar and said second gripper bar, respectively, out of engagement with said paper-engaging lip of said gripper bar housing.

6. A sheet conveyor including two endless belts, pulley means supporting said two endless belts for travel in unison in two spaced planes, a gripper bar housing including a bottom panel and a top panel secured in spaced relation to each other, said bottom panel having an up-turned paper-engaging lip, means connecting said gripper bar housing to said endless belts along a line substantially perpendicular to the two spaced planes of travel of said endless belts, a first gripper bar and a second gripper bar movably supported in said gripper bar housing, a first lever pivotally secured at one end to substantially the center of said first gripper bar, and intermediate its ends to said gripper bar housing, with its opposite end extending beyond said gripper bar housing, a second lever pivotally secured at one end to substantially the center of the said second gripper bar, and intermediate its ends to said gripper bar housing with its opposite end extending beyond said gripper bar housing, for effecting substantially simultaneous motion of said first gripper bar and said second gripper bar in a plane substantially parallel to said bottom panel; spring means mounted in said gripper bar housing to contact said first lever and said second lever for biasing said first gripper bar and said second gripper bar, respectively, into contact with said up-turned paper-engaging lip of said gripper bar housing to grip the leading edge of a sheet therebetween whereby the sheet is arched upward so that a portion of the sheet extends above the top of said gripper bar housing, and cam means positioned adjacent said endless belts to be in interference position at opposite ends of said gripper bar housing with said first lever and said second lever as said gripper bar housing is moved by said endless belts whereby said first lever and said second lever will be actuated to force said first gripper bar and said second gripper bar, respectively, out of engagement with said up-turned paper-engaging lip of said gripper bar housing.

7. A sheet conveyor including two endless belts, pulley means supporting said two endless belts for travel in unison in two spaced planes, a gripper gar housing including a bottom panel and a top panel positioned in spaced relation to each other, said bottom panel having an up-turned paper-engaging lip, means connecting said gripper bar housing to said endless belts along a line substantially perpendicular to the two spaced planes of travel of said endless belts, a first gripper bar and a second gripper bar movably supported in said gripper bar housing between said bottom panel and said top panel, spring means positioned in said gripper bar housing to normally bias said first gripper bar and said second gripper bar into contact with said up-turned paper-engaging lip of said gripper bar housing, a first lever pivotally secured in said gripper bar housing at one end to said first gripper bar and intermediate its ends to said gripper bar housing, with its opposite end extending beyond said gripper bar housing, a second lever pivotally secured in said gripper bar housing at one end to said gripper bar and intermediate its ends to said gripper bar housing with its opposite end extending beyond said gripper bar housing, and cam means positioned adjacent said endless belts to be in interference position with said first lever and said second lever as said gripper bar housing is moved by said endless belts whereby said first lever and said second lever will be actuated to force said first gripper bar and said second gripper bar, respectively, out of engagement with said paper-engaging lip of said gripper bar housing.

References Cited in the file of this patent

UNITED STATES PATENTS

| | | |
|---|---|---|
| 2,747,870 | Backhouse | May 29, 1956 |
| 2,950,914 | Golding | Aug. 30, 1960 |